Jan. 21, 1969  A. G. BLANTON  3,423,133
COTTON HARVESTER DELIVERY CONVEYOR AND METHOD OF CONVEYING
Filed Sept. 29, 1967
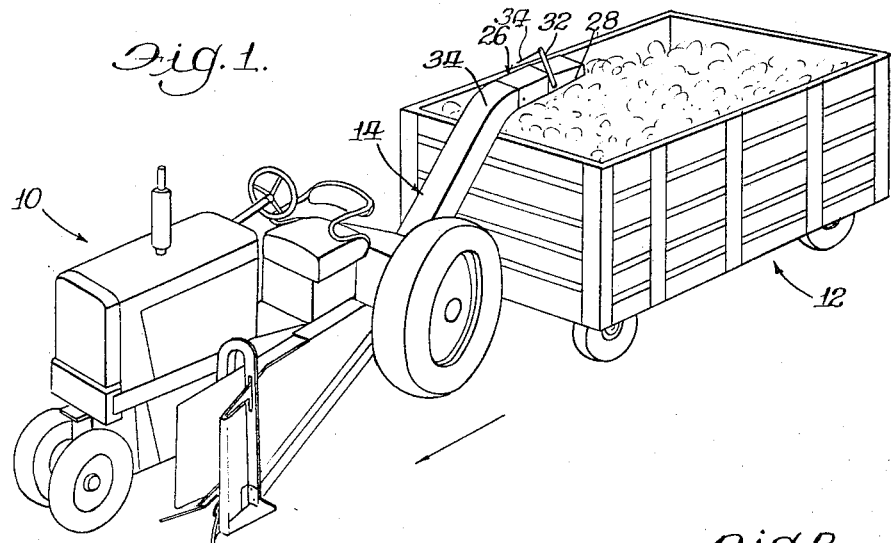
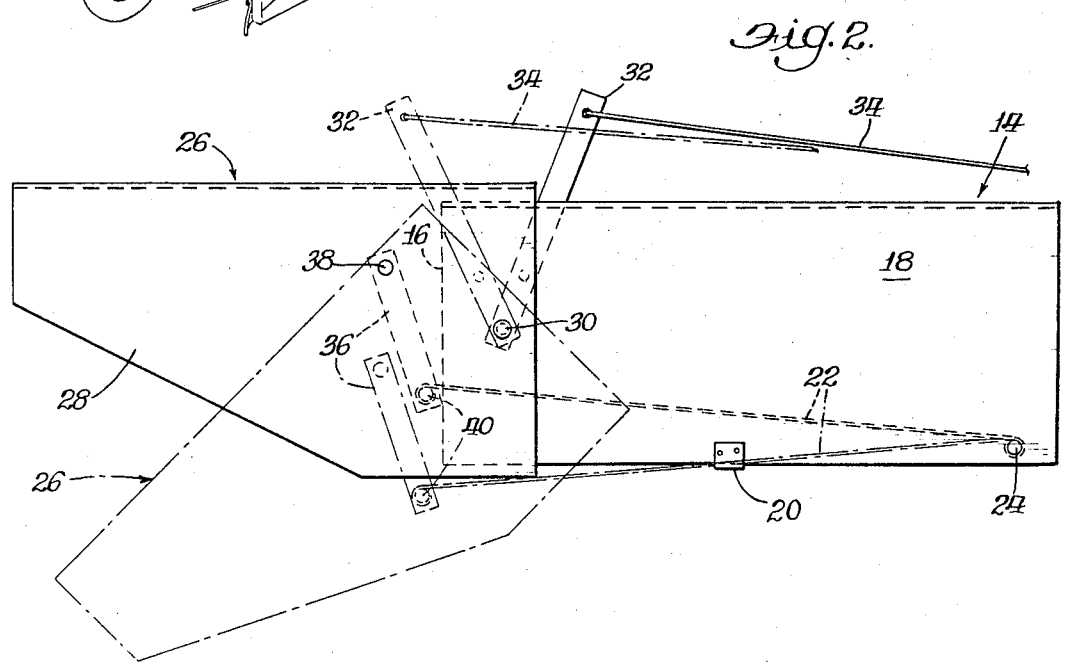
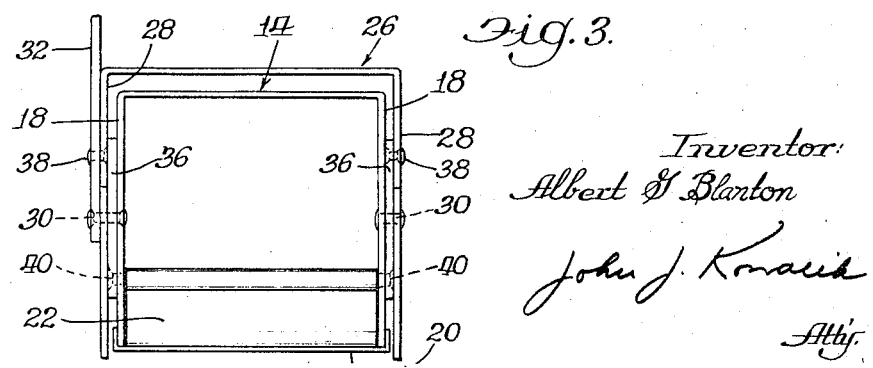
Inventor:
Albert G. Blanton
John J. Konarik
Atty.

United States Patent Office 3,423,133
Patented Jan. 21, 1969

3,423,133
COTTON HARVESTER DELIVERY CONVEYOR
AND METHOD OF CONVEYING
Albert G. Blanton, Memphis, Tenn., assignor to International Harvester Company, Chicago, Ill., a corporation of Delaware
Filed Sept. 29, 1967, Ser. No. 671,669
U.S. Cl. 302—61                6 Claims
Int. Cl. B65g 53/42

ABSTRACT OF THE DISCLOSURE

Delivery conduit having an outlet nozzle adjustable as to size, a hood for controlling the direction of flow of the air stream and cotton emerging from the conduit, the hood automatically adjusting the size of the nozzle according to different positions of the hood.

Objects of the invention

There has long been a serious difficulty in loading cotton upon being picked. The cotton is carried in an air stream to a receptacle, such as a trailer, and the conduit or pipe carrying the air stream is directed to the receptacle at one end or side thereof. The stream of air carrying the cotton is first directed to the far end of the receptacle and as the receptacle fills, then directed toward the near end, the direction of flow being accomplished by suitable means such as a hood mounted on the conduit or pipe. In order for the stream to be effectively delivered to the far end of the receptacle, the outlet nozzle of the conduit is made of reduced size to increase the rate of flow for carrying it to that distance. However as the stream is then directed to the near end of the receptacle, the high rate of flow causes disruption and "boiling" of cotton.

A broad object of the present invention is to overcome the foregoing difficulty.

Another object is to provide an arrangement whereby the outlet nozzle of the conduit is adjusted to small size for producing a high rate of flow for carrying to the far end of the receptacle, and adjusted to a large size for decreasing the rate of flow for delivering the stream to the near end of the receptacle.

A more specific object is to provide an arrangement of the foregoing character in which the conduit carrying the cotton laden stream is provided with a hood for directing the stream to the different parts of the receptacle, with the feature that the outlet nozzle of the conduit is automatically adjusted to the different sizes as mentioned in response to the movement of the hood to different positions for correspondingly controlling the flow of the stream.

Description of a preferred embodiment of the invention

FIGURE 1 illustrates a cotton harvester, a receptacle for the cotton, and the construction of the present invention;

FIGURE 2 is a large scale detail view of the specific apparatus of the present invention; and FIGURE 3 is an end view taken from the left of FIGURE 2.

Referring now in detail to the accompanying drawings, FIGURE 1 shows a cotton harvester 10 of known kind such as a stripper drawing a trailer 12 also of known kind serving as a receptacle for the cotton. Although the present illustration includes a trailer which serves as a receptacle, the invention is applicable also to use with other kinds of receptacle.

The harvester 10 includes a delivery conduit or pipe 14 through which the stream of air is impelled which carries the picked cotton, the air and cotton together hereinafter being referred to as a fluid, i.e., flowing material. This conduit or pipe is directed into the receptacle for the cotton and is adjacent the horizontal for delivering or blowing the cotton to the far end of the receptacle. The delivery end of the conduit, indicated at 16, forms a nozzle, which as described below, can be adjusted as to size.

The conduit 14 is preferably rectangular in cross section having depending side walls 18, and an open bottom portion adjacent the nozzle, the lower edges of the side walls being interconnected in spaced position by a fixed tie strap 20. The nozzle 16 is bounded on the bottom by a movable plate or vane 22 which is pivotally mounted by means of laterally extending pins or trunnions 24 mounted in the side walls 18 at a position removed from the nozzle 16 of the conduit, while its swinging end terminates in the nozzle and defines the lower bounding element thereof. The plate or vane 22 is movable between limit positions indicated in FIGURE 2.

A hood 26 generally of shell shape and having a top element and depending side wall elements 28 is pivotally mounted on the conduit 14 on a horizontal axis. This mounting is accomplished by pins or trunnion elements 30 mounted in the side walls 18 of the conduit.

An arm 32 is fixed to the hood and extends to a convenient location where a rod 34 is pivotally connected and reaches to the operator's station for use by him in swining the hood to different positions as referred to below.

A link 36, preferably on each side, is pivoted at one end in a side wall 28 of the hood, and its other end to the swinging end of the plate 22.

The hood 26, under the control of the operator through the rod 34, is movable between an upper position shown in full lines in FIGURE 2 and a lower position shown in dot-dash lines in that view. In its upper position it may for example be straight for forming a longitudinal extension of the conduit, i.e., positioned for enabling the fluid in the conduit to continue in the direction of its flow as it emerges from the conduit. In the lower, dot-dash line position, it is at a substantial angle to that direction of flow, for deflecting the fluid from its then direction of flow, and in this case is directed downwardly.

A trailer used for receiving the picked cotton is usually long, and the cotton is blown into it from an end thereof. In the case of such a long trailer, heretofore the user had two alternatives: blow the cotton into the trailer at a reduced rate so as not to blow any of it out of the trailer and retain all therein, and in this case it was necessary to employ an additional man to feed the cotton to the far end of the trailer; the other alternative was to provide an increased rate of flow of the cotton laden stream so that the cotton will carry to the far end of the trailer, but in this case when the stream was directed to the near end of the trailer, it causes boiling and uncontrollable flying of the cotton, with losses thereof.

In the present case in the initial portion of the filling of a trailer, the hood is moved to its upper position, and this position of the hood raises the plate 22 to its uppermost position, correspondingly reducing the size of the orifice 16 with corresponding increase in the rate of flow of the fluid. The hood as noted above in this position enables the fluid to continue flowing in the direction it assumed emerging from the conduit, and because of the increased rate of flow, the stream carries the cotton to the far end of the receptacle. As the receptacle fills, the hood is lowered progressively, for deflecting the stream for depositing the cotton at positions in the trailer progressively toward the near end. As the hood is moved downwardly the plate 22 is progressively lowered, correspondingly increasing the size of the nozzle and in turn correspondingly decreasing the rate of flow of the fluid. Finally at a maximum lower position of the hood and maximum increased size of the nozzle, the final increment of cotton is deposited in the trailer at the near end without loss of cotton as referred to above. The invention enables the elimination of an extra man for working the cotton into position in the trailer, and it is of extremely simple construction and of usual effectiveness.

I claim:

1. A device of the character disclosed comprising a fluid conduit having an outlet nozzle, means for controlling the direction of flow of fluid as it emerges from the nozzle, and means responsive to operation of said controlling means for varying the size of said nozzle wherein the controlling means in a first condition is operative for directing flow of fluid emerging from the conduit in substantially the direction of the conduit and the nozzle is of reduced size, and in a second condition is operative for directing it at an acute angle to the conduit and the nozzle is of increased size.

2. The invention set out in claim 1 in conjunction with said fluid conduit disposed adjacent the horizontal, and wherein in the second condition of the controlling means the fluid is directed generally downwardly.

3. A device of the character disclosed comprising a fluid conduit having an outlet nozzle, means for controlling the direction of flow of fluid as it emerges from the nozzle, and means responsive to operation of said controlling means for varying the size of said nozzle, wherein the fluid conduit adjacent the nozzle therein has a wall element movable toward and from an opposite wall element, and the size of the nozzle is varied by such movement of said movable wall element, wherein said movable wall element is pivotally mounted with a swingable end adjacent said nozzle, and wherein said controlling means includes a hood movably mounted on the fluid conduit and operative for deflecting fluid emerging from the nozzle according to its different positions of movement and also operative for positioning the pivoted wall element according to its said different positions for varying the size of the nozzle.

4. The invention set out in claim 3 wherein the fluid conduit is generally rectangular in cross section, the movable wall element constitutes one side wall of the fluid conduit and its swinging end forms a bounding element of said nozzle, the hood is pivoted in side wall elements of the fluid conduit laterally of the movable wall element, a link is pivotally connected at one end to the swinging end of the movable wall element and at its other end to the hood at a position displaced from the axis of pivotal mounting of the hood, the hood having a first position in which the fluid from the conduit flows through the hood in a continuation of the direction it emerges from the conduit and the movable wall element is positioned for defining a reduced size of nozzle, and various positions to an extreme opposite position in which it deflects the fluid emerging from the conduit and the movable wall element is positioned for defining an increased size of nozzle.

5. Apparatus of the character disclosed in conjunction with a cotton harvester having a fluid conduit terminating in an outlet nozzle directed adjacent the horizontal, and means for producing an air stream in the conduit for carrying cotton therein, the harvester being adapted for use with a receptacle for receiving cotton carried by the air stream with the outlet nozzle of the conduit disposed adjacent a near end of the receptacle, the conduit including means for adjusting the size of the outlet nozzle, and means for controlling the direction of flow of fluid as it emerges from the outlet nozzle, said controlling means being movable between a first position in which the fluid flows therethrough in the same direction it leaves the conduit and is operable for defining a reduced size of outlet nozzle and the fluid flows to the far end of the receptacle, and to various positions to an extreme opposite position in which it deflects the emerging fluid to the near end of the receptacle and is operable for defining an increased size of outlet nozzle.

6. In a cotton harvester comprising, a cotton picking apparatus and means delivering the cotton in a fluid stream through a generally horizontal conduit into a receptacle, means defining a reduced size of outlet nozzle when it is generally horizontally directed, and thereby producing an increased rate of flow of fluid and directing the fluid to an end of the receptacle remote from the outlet nozzle, said means defining an increased size of outlet nozzle when it is downwardly directed and thereby producing a reduced rate of flow of fluid and directing the fluid to an end of the receptacle near the outlet nozzle.

References Cited

UNITED STATES PATENTS

| | | | |
|---|---|---|---|
| 1,866,806 | 7/1932 | Holly | 302—63 |
| 2,742,329 | 4/1956 | Hansen | 302—61 |

ANDRES H. NIELSEN, *Primary Examiner.*